United States Patent [19]

Trevisani

[11] Patent Number: 4,848,972
[45] Date of Patent: Jul. 18, 1989

[54] PROCESS AND APPARATUS FOR WIDENING ROADWAYS

[75] Inventor: Davide Trevisani, Cesena, Italy

[73] Assignee: Trevi S.P.A., Cesena, Italy

[21] Appl. No.: 167,758

[22] Filed: Mar. 14, 1988

[30] Foreign Application Priority Data

Mar. 20, 1987 [IT]  Italy .................................. 3404 A/87

[51] Int. Cl.$^4$ ....................... E02D 17/20; E02D 29/02
[52] U.S. Cl. .................................... 405/262; 405/284; 405/287
[58] Field of Search ............... 405/262, 284, 285, 286, 405/287, 258, 272; 404/72, 75

[56] References Cited

U.S. PATENT DOCUMENTS 4,132,498  1/1979  Ikeda et al. ..................... 405/284 X
4,369,004  1/1983  Weatherby .......................... 405/262

Primary Examiner—David H. Corbin
Attorney, Agent, or Firm—Guido Modiano; Albert Josif

[57] ABSTRACT

The present invention relates to a process for widening roadways. The process starts with digging a trench of adequate depth in the slope of the embankment of the existing roadway at a distance corresponding to the widening. A wall is then built in the trench by means of prefabricated elements or by on-site casting, and is subsequently anchored to the road embankment by means of tension elements. The wall rises substantially to the level of the roadway so as to define a channel which is then filled with stabilized material, on which the road paving is completed up to the wall.

26 Claims, 4 Drawing Sheets

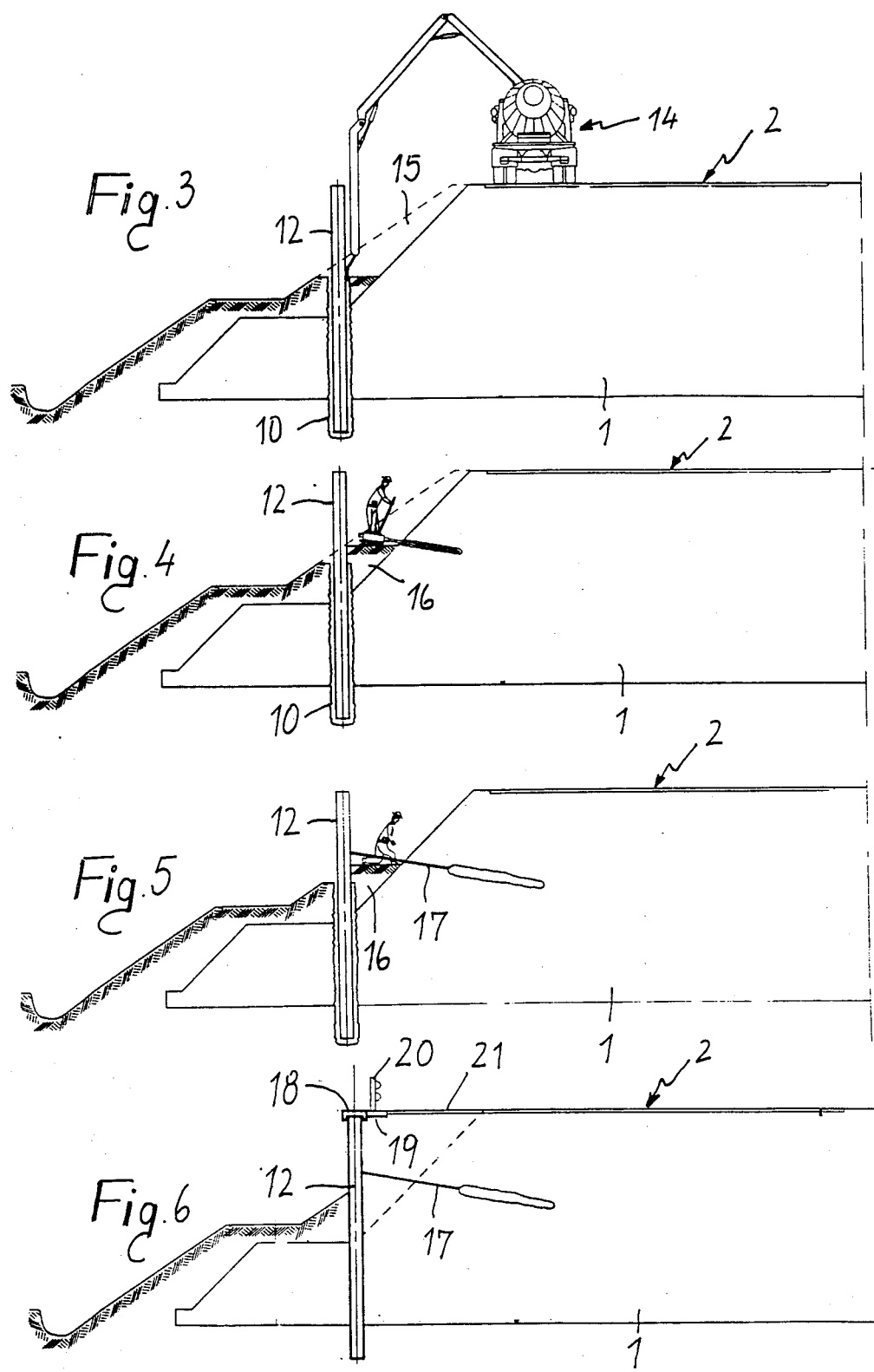

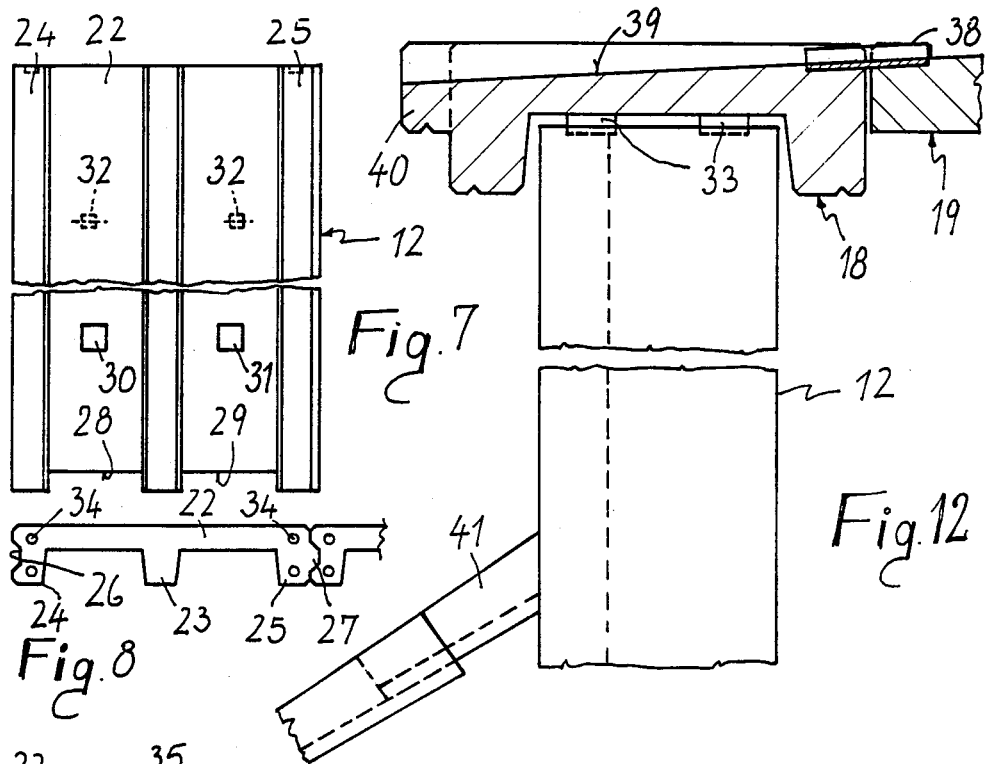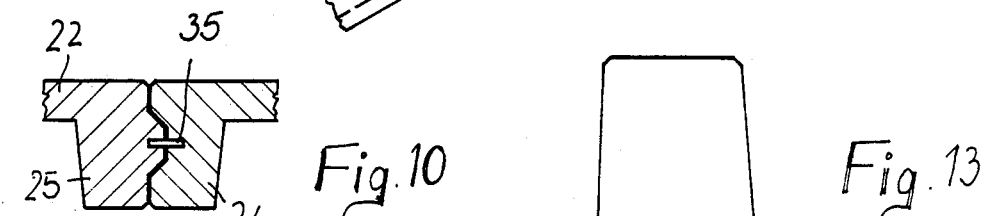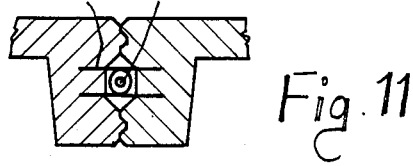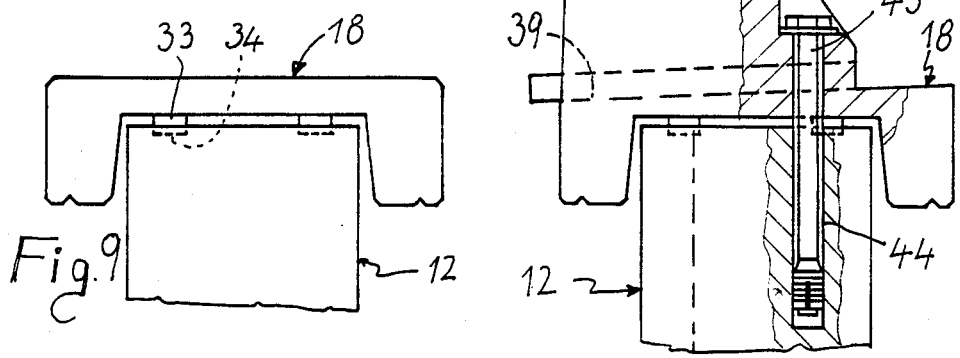

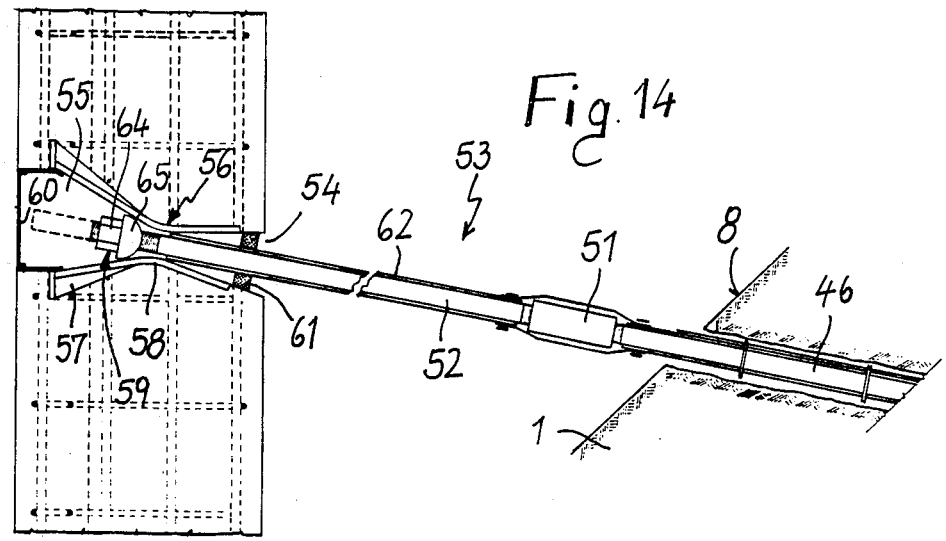
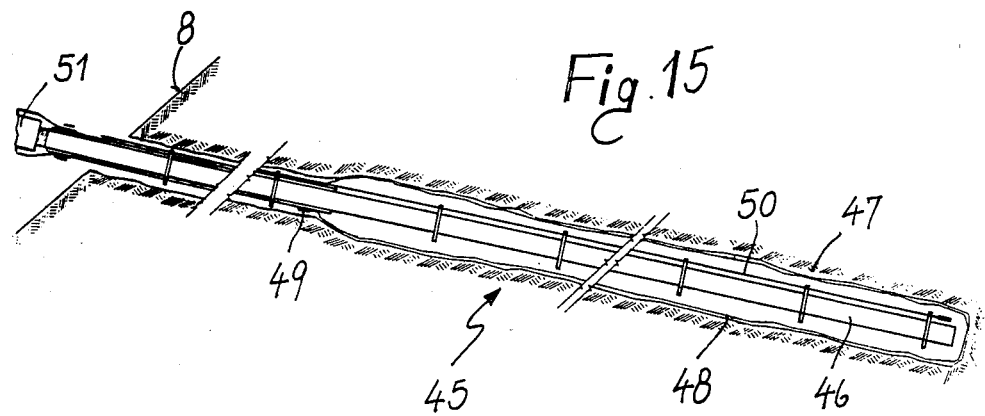
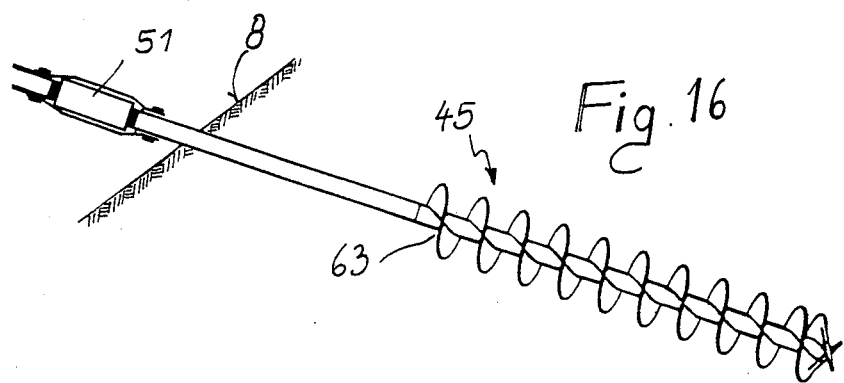

PROCESS AND APPARATUS FOR WIDENING ROADWAYS

BACKGROUND OF THE INVENTION

The present invention relates to a process and apparatus for widening roadways.

As is known, the increase of motor vehicle traffic has worsened the problem of the widening of most of the road network and particularly of highways.

In particular for highways an increase in the number of lanes has been proposed which, considering the fact that highway roadways usually run on embankments, entails a series of problems. First of all it must be observed that the widening is possible only with the expropriation of the neighboring properties and therefore with the considerable burdens which derive therefrom, also in relation to the long times in which such expropriations may be executed.

Secondly, modifications of the territorial and economical configuration of the areas affected by the widening would occur.

From a technical point of view the widening requires considerable volumes of added embankment material required to integrate the road embankments, with the consequent damages to the ordinary road networks bordering the highways, caused by the transit of the vehicles used for earth moving. Furthermore, an increase would occur in the extraction activities, with the environmental problems related thereto.

SUMMARY OF THE INVENTION

The technical aim of the present invention is to provide a process which obviates, or at least significantly reduces, the above described disadvantages.

Within this aim, an object of the present invention is to provide a process which allows to widen the roadway in times significantly shorter than those required by a conventional system.

A further object of the present invention is to provide an apparatus to execute such a process.

This aim and these objects are achieved by a process for widening roadways, characterized in that it comprises the steps of digging a trench of adequate depth in the slope of the embankment at a distance from the existing roadway corresponding to the selected widening, building a wall in said trench which rises substantially to the level of the roadway and delimits a channel with the slope of the embankment, anchoring said wall to the road embankment by means of tension elements, filling the channel with material and completing the road paving up to said wall.

BRIEF DESCRIPTION OF THE DRAWINGS

Further characteristics and advantages of the present invention will become apparent from the following description, with reference to the accompanying drawings, wherein:

FIGS. 1-6 illustrate various situations of the widening work as the process advances;

FIG. 7 is a view of a prefabricated wall for the execution of the process;

FIG. 8 is a plan view of the wall of FIG. 7;

FIG. 9 is a view of the top of a wall on which a covering element is arranged;

FIGS. 10, 11 illustrate two types of coupling between two adjacent walls;

FIG. 12 illustrates a solution related to the drainage of rainwater;

FIG. 13 is a type of guardrail usable with the invention;

FIG. 14 is a view of the coupling to the wall of an anchoring tension element; and FIGS. 15 and 16 illustrate two types of anchoring of a tension element to the road embankment.

DESCRIPTION OF THE PREFERRED EMBODIMENTS

Figure 1:
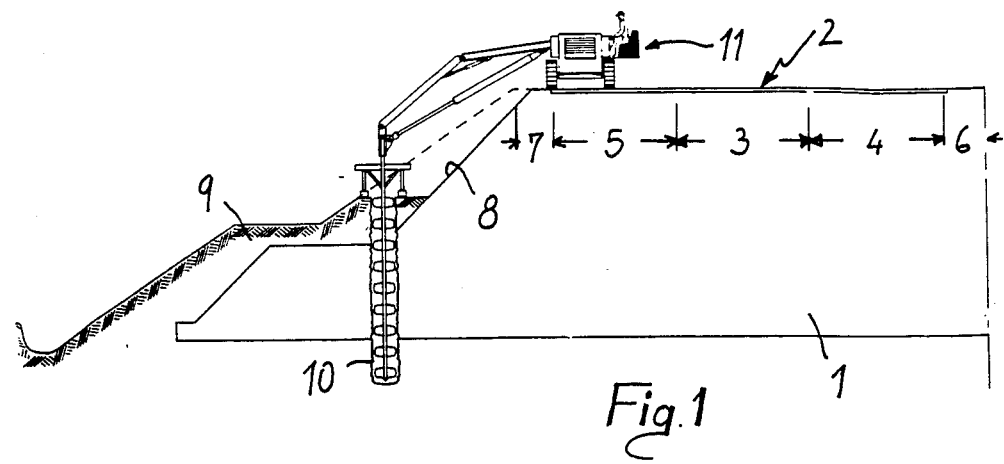

With reference to FIGS. 1-6, it is illustrated the cross section of half of a conventional roadway, in which 1 indicates the road embankment on which there runs the carriageway 2, composed of two lanes 3, 4 and of an emergency lane 5. The directional separator lane 6 is to the side of the lane 4 (passing lane), while the verge 7 is to the side of the emergency lane 6.

The embankment 1 forms a slope 8 which is covered with a protection layer 9 which has inferior mechanical characteristics with respect to those of the embankment 1.

The process according to the invention comprises the steps of (see FIG. 1) removing the upper region of the protection 9 (delimited by the broken line) until the uncovering of the embankment 1 is achieved, and then digging a trench 10 at a distance from the outer edge of the emergency lane 5 corresponding to the desired widening.

The trench 10 can be dug by an excavator 11 equipped with a clamshell bucket or a mill which advances along the emergency lane.

Figure 2:
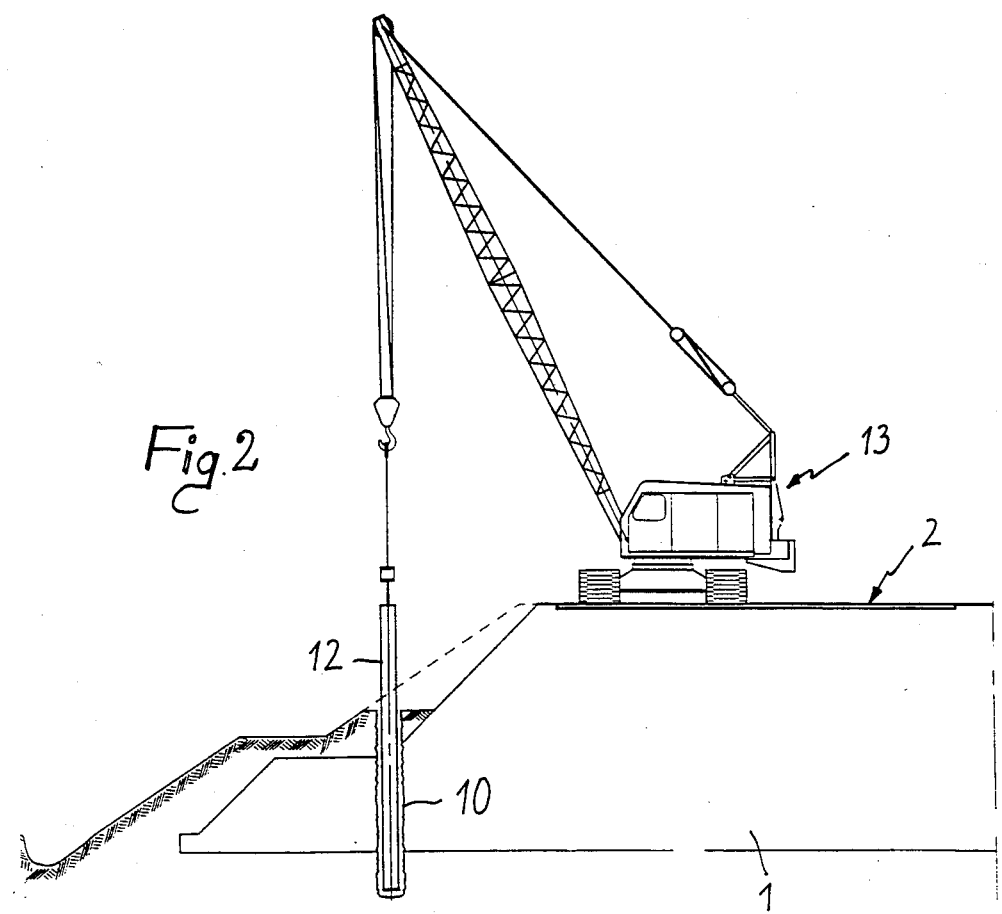

Prefabricated walls 12, the structure whereof will be described in greater detail hereinafter, are then positioned along a vertical plane in the trench 10 (see FIG. 2). The walls can be positioned by means of a crane 13.

Once the positioning of the walls is completed, their sealing is performed by means of concrete fed from a truck mixer 14 (FIG. 3). Conveniently, the walls 12 are provided with transfer passages to allow the rise of the concrete on both sides of the wall even when it is poured from the inner side.

It should be noted that the crane 13, the excavator 11 and the truck mixer 14 have dimensions no greater than the width of the lanes 3 and 5 so that vehicle traffic can proceed in the passing lane 4 without being subject to interruptions.

The top of the wall 12 is substantially at the level of the paving of the carriageway so that a channel 15 is formed between the wall 12 and the slope 8 of the embankment 1, and is then filled with stabilized material to form a wedge 16 (FIG. 4) defining a work level for the placement of tension elements 17 (FIG. 5) by means of which the walls are anchored to the embankment 1.

The structure of said tension elements will be described hereinafter with reference to FIGS. 14-16.

Finally, the channel 15 is filled with stabilized material and the wall covering element 18, the water collection gutter 19, the guardrail 20 and the paving 21 are completed.

As can be seen, the described process fully achieves the intended aims. It should be noted that in order to perform the widening, the same structural elements are used regardless of the height of the road embankment.

Furthermore, the widened region is particularly stable since the walls sink into stabilized and compacted material with high mechanical characteristics.

The wall 12, besides with prefabricated modular elements, can also be provided with on-site casting.

However, the solution with prefabricated modular elements seems preferable. Conveniently, a prefabricated element suitable for the purpose (see FIGS. 7 and 8) comprises a rectangular panel 22, provided with a central rib 23 and with two lateral ribs 24, 25, all in reinforced concrete.

A groove 26 and respectively a ridge 27 are provided in the outer faces of the ribs 24, 25, that is to say on the heads of the element 12. The cross sections of the groove and of the ridge are mutually complementary so that, by placing the elements 22 adjacent to one other, the ridge of one element inserts into the groove of the adjacent one thus providing a continuous wall.

Conveniently, the ribs 23-25 extend downwards beyond the lower edge of the panel 22 so that two loops 28, 29 form which serve for the transfer of the concrete during the sealing step (see FIG. 3). Two openings 30, 31 are provided for the same purpose in the panel 22 at an appropriate distance from the upper edge.

Lifting bushes 32 are sunk in the panel 22 for the placement of the modular elements. Further bushes are provided at the top of the modular element at the lateral ribs 24, 25. The bushes are shaped to allow the coupling of lifting elements both during the operations of loading of the modular elements on the transport vehicles and for the positioning of the modular elements during the placement in the trench.

The covering or protective element 18 is constituted by a sort of large bent tile having a cross section in the shape of an inverted U, which is rested on the top of the modular elements 12 with the interposition of plugs 33 which engage in appropriate recesses provided at the top of the ribs 24, 25.

The plugs 33 are provided in hard rubber or the like.

For the execution of the wall 12, the modular elements may be dry-coupled or connected with sealants. In the first case (see FIG. 10) a strip 35 in filtering material is arranged in the junction and has the purpose of retaining the solid particles and of allowing the water which may infiltrate in the embankment to pass, avoiding thereby the washout of the filling material through the slit of the junction. Preferably the strip 35 is provided in open-cell polyurethane or the like.

FIG. 11 illustrates a solution in which both lateral ribs of the modular element have, on the heads, respective grooves from which brackets 36 protrude. By placing the modular elements adjacent, the brackets 36 are linked by a rod 37 driven through the brackets and sunk into a completion casting in cement grout.

The gutter 19 for the conveyance of the water is constituted by a slab in which a step 38 defines a drainage channel (see FIG. 12). The downflow of the water at the sides of the roadway occurs through channels 39 which cut the step 38 and continue with a suitable inclination on the tiles. Naturally only some of the tiles, at preset distances, will have drainage channels which continue outside the tiles with gargoyles 40 which convey the water towards an underlying downflow offlet 41.

According to a variated aspect of the invention, the tiles 18 can be provided monolithically with a guardrail in reinforced concrete of the so-called "New Jersey" type. The guardrail will be anchored to the top of the modular elements 12 by means of anchoring bolts 43 driven through the base of the guardrail and engaging in respective dead holes 44 formed in the ribs 24, 25 of the modular elements.

Particular care must be taken in the placement of the tension elements 17 which anchor the modular elements 12 to the embankment.

In FIGS. 14 and 15, a so-called active part 45 (that is the part for anchoring to the ground) of a tension element, comprises a rod 46 adapted to be inserted in a hole 47 provided in the slope of the embankment. A bag of non-woven fabric is arranged around the end of the rod 46, fixed thereto by a clamp 49.

A tube 50 extends in the bag 48 which, by means of pump means, cement grout is injected under pressure and, by the filtering effect performed by the fabric of the bag, determines a firm anchoring in the ground.

The rod 46 has a threaded end which protrudes from the hole 47 and on which a nipple 51 is screwed in which a rod 52 of the so-called passive part 53 of the tension element is also screwed.

The ends of the rods 46 and 52 which engage in the nipple 51 have counterposed threads which allow, by screwing or unscrewing the nipple, to tighten or slacken the tension element.

The end of the rod 52 opposite to the nipple 51 is also threaded and engages in a recess 55 of said rib through an opening 54 provided in the central rib 23 of the modular element 12.

The recess 55 is constituted by a box-like frame 56 in the shape of an hourglass with outer ridges 57 and having a neck 58 which acts as abutment for a nut 59 screwed onto the end of the rod 52.

The recess 55 contains a lubricant and is closed by a door 60, while an annular plug 61 closes the opening 54 for the insertion of the rod.

The described tension element is completed by a coating 62 intended to protect the passive part 53 and the active part 45 which remains external to the sac 48, as well as the nipple 51. Preferably, the coating 62 is provided with epoxy resins or with hot-galvanization or by means of a PVC sheathing.

It should be noted that the nipple 51 has the function of putting under traction the tension element during the placement of the walls 12, while by means of the nut 59 it is possible to recover any relaxations which may intervene in the course of time, the nut 59 being always accessible through the door 60.

According to a further variated aspect of the invention, the active part of the tension element may be constituted by a screw 63 (see FIG. 16) which is screwed into the embankment and then connected to the passive part.

Advantageously, the nut 59 has a hexagonal portion 64 for the engagement of an adapted screwing tool and a hemispherical portion for abutment on the neck 58.

Said hemispherical shape, in combination with the shape of the frame 57, diverging towards the opening 54, allows the recovery of any axial offset of the tension element with respect to the frame.

Further modifications and variations of the process are possible, all within the scope of the inventive concept. Furthermore, the shapes and dimensions of the structural elements may vary according to the contingent requirements.

I claim:

1. Process for widening of roadways, said roadways having embankments having a downward slope therefrom and said embankments being covered with a protection layer, said process comprising the steps of:

digging a trench of adequate depth in said slope of said embankment at a distance from the existing roadway corresponding to the selected widening;

building a wall in said trench, said wall having substantially the width of said trench and having an upper part rising out of said trench substantially to the level of said roadway, said upper part of said wall and the section of the said embankment sloping uphill to said roadway delimiting a channel;

installing tension elements to anchor said wall to said embankment, said tension elements comprising a first section anchored to said embankment and a second section anchored to said wall, the coupling of said first and second sections being done within said channel;

filling said channel with roadbed material and paving over said roadbed material thus completing said widening of said roadway up to said wall.

2. Process according to claim 1, wherein the wall is stabilized in said trench by the introduction of a concrete-like material.

3. Process according to claim 1, wherein said protection layer of said embankment is previously removed between the roadway and the position of said trench.

4. Process according to claim 1, wherein said channel is partially filled to define a work level for said installing of said tension elements.

5. Process according to claim 1, wherein a protective element is positioned on top of said wall.

6. Process according to claim 1, wherein said wall is provided comprising prefabricated modular elements.

7. Process according to claim 1, wherein said wall is provided by on-site casting.

8. Apparatus for use in widening roadways, said roadways having embankments having a downward slope therefrom, said embankments having a trench dug in said slope at a distance from the existing roadway corresponding to the selected widening, said apparatus comprising:

a wall having substantially the width of said trench and a height substantially equal to the vertical distance between the bottom of said trench and the level of said roadway, said wall having through ports at a height greater than the depth of said trench;

tension elements to anchor said wall to said embankment, said tension elements each comprising a first section which anchors to said embankment and a second section which anchors to said wall by engaging in one of said through ports, said first and second sections of said tension elements being connected by a coupling element.

9. Apparatus according to claim 8, wherein said wall comprises prefabricated modular elements having panels with a vertical central rib and two vertical lateral ribs.

10. Apparatus according to claim 9, wherein said ribs extend beyond the lower edge of said panels so as to define legs and thus passageways between said legs for the flow of concrete-like material to the other side of said panels from below, holes also being provided in said panels for the flow of concrete-like material to the other side of said panels.

11. Apparatus according to claim 9, wherein each of said vertical lateral ribs are provided with a coupling member along its outer face to engage with a coupling member of a vertical lateral rib of an adjacent one of said panels, said coupling members of said adjacent panels being, respectively, a ridge and a groove defining a male-female coupling.

12. Apparatus according to claim 11, wherein seats are provided in said ridge and said grove for the accommodation of a filtering element.

13. Apparatus according to claim 9, wherein along the outer faces of both of said vertical lateral ribs grooves are provided from which protrude U-shaped brackets such that, by placing modular elements adjacent, the brackets are linked by a rod driven through them and are sunk into a completion casting.

14. Apparatus according to claim 9, wherein said through ports are located in said central ribs, said through ports being constituted by a box-like frame having a substantially hourglass-like shape with a longitudinally ridged surface, the neck of said hourglass-like shape acting as abutment for anchoring said second section of said tension element, said frame defining a recess accessible through a door from one side of said modular element and an opening on the other side for the passage of said second section of said tension element.

15. Apparatus according to claim 8, wherein said wall is capped by a protective element.

16. Apparatus according to claim 15, wherein said protective element comprises a large bent tile having a cross section in the shape of an inverted U, said bent tile resting on the top of said wall with the interposition of plugs which engage in recesses in the said top of said wall.

17. Apparatus according to claim 16, wherein said protective element comprises an upper channel ending in a gargoyle for the drainage of water.

18. Apparatus according to claim 16, wherein a guardrail of the so-called "New Jersey" type is monolithically provided on said bent tile.

19. Apparatus according to claim 18, wherein said tile is fixed to the said top of said wall by means of through bolts which engage in dead holes of said wall.

20. Apparatus according to claim 8, wherein said first section of said tension element comprises a rod with an anchoring device on a first end, said first end of said first section being insertable into said slope of said embankment, said second section of said tension element comprising a rod adapted for anchoring to said wall on a first end and on a second end to be connected to the second end of said first section by said coupling element, said coupling element being a nipple screwable onto the second ends of said first and second sections having couterposed threads to put said rods of said first and second section under tension.

21. Apparatus according to claim 20, wherein said first end of said second section has threads onto which a nut is screwed, said nut abutting on said neck within said box-like frame.

22. Apparatus according to claim 21, wherein said nut has a polygonal portion for the engagement of a tightening tool and a hemispherical portion for said abutment on said neck.

23. Apparatus according to claim 20, wherein said anchoring device comprises a bag of non-woven fabric covering part of said first section including its said first end, a tube extending into said bag for the introduction of cement grout or the like, said anchoring device being insertable into a hole in said slope of said embankment.

24. Apparatus according to claim 20, wherein said anchoring device is constituted by a screw screwable into the embankment.

25. Apparatus according to claim 20, wherein the parts of said rods of said first and second sections which remain buried in the filling material are covered by a protective coating.

26. Apparatus according to claim 25, wherein said protective coating is provided by epoxy resins or hot-galvanization or by means of a PVC sheathing.

* * * * *